United States Patent [19]

Itoh

[11] 4,194,782
[45] Mar. 25, 1980

[54] FOLDABLE SEAT STRUCTURES FOR AUTOMOBILES

[75] Inventor: Takahisa Itoh, Hiroshima, Japan

[73] Assignee: Toyo Kogyo Co., Ltd., Hiroshima, Japan

[21] Appl. No.: 968,853

[22] Filed: Dec. 12, 1978

[30] Foreign Application Priority Data

Dec. 13, 1977 [JP] Japan .......................... 52-167996[U]

[51] Int. Cl.² ............................................. B60N 1/02
[52] U.S. Cl. ................................... 296/65 R; 297/232
[58] Field of Search ............... 296/65 R, 63; 297/232, 297/234, 243

[56] References Cited

U.S. PATENT DOCUMENTS

| | | | |
|---|---|---|---|
| 3,095,232 | 6/1963 | Stevens | 296/65 R |
| 3,317,175 | 5/1967 | Ford | 296/65 R |

Primary Examiner—Philip Goodman
Attorney, Agent, or Firm—Fleit & Jacobson

[57] ABSTRACT

Disclosed is an automobile having front and rear seat structures, the rear seat structure comprising forward and rearward rows of folding seats. The forward and rearward rows of seats of the rear seat structure are interconnected in such a manner that the rearward row can be moved towards the forward row, and then both the forward and rearward rows can be moved towards the front seat structure to provide a substantially unobstructed space behind the folded rows of seats.

7 Claims, 12 Drawing Figures

FOLDABLE SEAT STRUCTURES FOR AUTOMOBILES

The present invention relates to seat structures for automobiles and more particurlarly to foldable seat structures for automobiles. More specifically, the present invention pertains to automobiles having rear passenger seats which are arranged in a plurality of rows and foldable so that the space can be provided when folded for cargos.

In conventional structures, the rear seat assembly in the first or forward now has a back rest foldable over a seat mat which is provided on a leg structure. The leg structure is pivotably attached to the floor of the automobile so that the seat assembly can be forwardly swung after the back rest has been folded over the seat mat to thereby locate the seat mat and the back rest just behind the front seat. The rear seat assembly in the second or rearward row also has a back rest foldable over a seat mat which is provided on a leg structure. In the second row seat assembly, the leg structure is however attached removably to the floor of the automobile through detachable fittings so that the seat assembly can be moved forwardly after the back rest has been folded over the seat back and the leg structure has been detached from the floor.

In the conventional arrangements, inconveniencies have therefore been experienced in folding the seat assembly in the second row because the leg structure has to be detached from the floor. Another problem in the conventional arrangements has been caused by the fact that the seat assembly in the first row can be folded independently from the seat assembly in the second row. It may be possible to use the automobile with the first row seat in the folded position and passengers in the second row seat so that a cargo space is provided just in front of the passengers in the second row seat. If cargos are loaded in the space in front of the second row seat, there will be a danger to the passengers in the second row seat because the cargos may fall over the passengers or the passengers may trip under a rapid deceleration over the cargos.

It is therefore an object of the present invention to provide foldable rear seat structures which are ready to handle.

Another object of the present invention is to provide an automobile having rear seat assemblies which are arranged in a plurality of rows and interconnected in such a manner that the seat assembly in a forward row cannot be folded independently from the seat assembly in a rearward row.

A further object of the present invention is to provide a rear seat folding mechanism which can prevent formation of a cargo space in front of a seat assembly.

According to the present invention, the above and other objects can be accomplished by an automobile comprising a body which has a floor, front and rear seat means provided on the floor, said rear seat means including a plurality of seat assemblies arranged in a plurality of rows including a first row and a second row which is behind the first row, the seat assembly in the first row comprising a front leg structure carrying seat mat means and a rear leg structure carrying seat back rest means, said front leg structure being pivotably attached at lower end to the floor of the body, said rear leg structure having rearwardly extending link means, the seat assembly in the second row comprising a front leg structure having lower end pivotably connected with said rearwardly extending link means whereby the seat assembly in the first row can be folded by pivotably moving its front leg structure only after the seat assembly in the second row has been folded by turning the front leg structure of the second row seat assembly over the rearwardly extending link means.

In a preferable mode of the present invention, the front leg structure of the first row seat assembly is of a substantially L-shaped configuration having a horizontal portion and a vertical portion, and the rear leg structure of the same seat assembly is pivotably connected to the horizontal portion of the front leg structure. The second row seat assembly may have a similar construction including a rear leg structure which carries seat back rest means and is pivotably connected to the front leg structure of the same seat assembly. The rear leg structure of the second row seat assembly may be detachably secured to the floor through suitable locking means.

According to this arrangement, the second row seat assembly can be moved into a folded or retracted position by disengaging the locking means and moving the rear leg structure forwardly maintaining it in a substantially vertical position. Then, the front leg structure of the same seat assembly is turned over the link means in the first row seat assembly. Thereafter, the rear leg structure in the first row seat assembly may be moved forwardly maintaining its original position together with the second row seat assembly, whereby the front leg structure of the first row seat assembly is turned over the floor so that the seat assemblies can be compactly folded.

The above and other objects and features of the present invention will become apparent from the following descriptions taking reference to the accompanying drawings, in which.

Figure 7A:
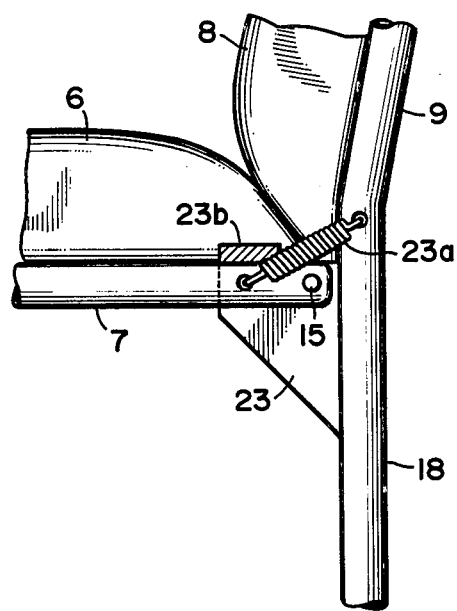
Figure 7B:
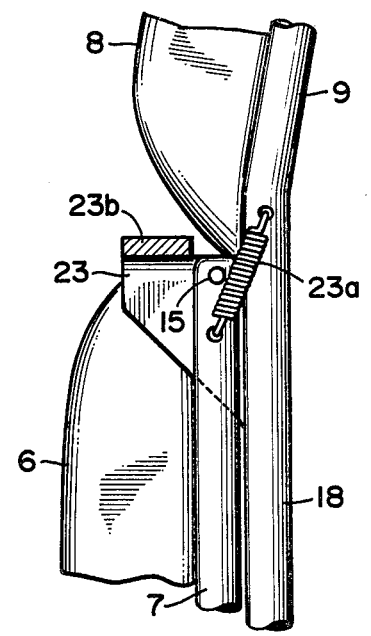
Figure 7C:
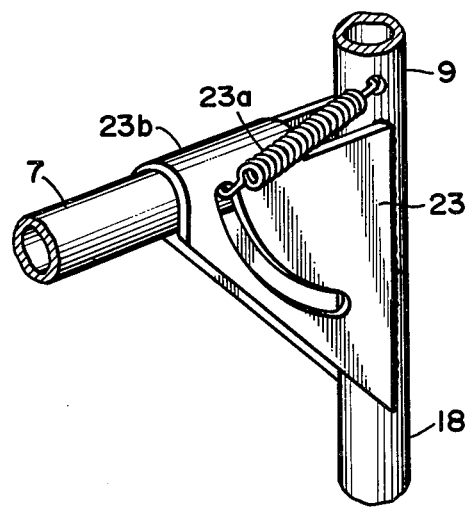

FIGS. 6 (a), (b), (c) and (d) show one example of locking mechanism; and,

FIGS. 7 (a), (b) and (c) show connections between front and rear leg members in the seat assembly.

Figure 1:
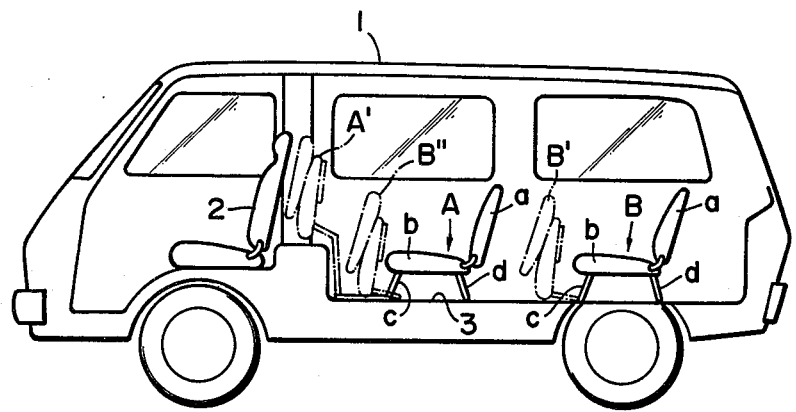
FIG. 1 is a longitudinal section of an automobile having conventional foldable rear seat assemblies.
Figure 2:
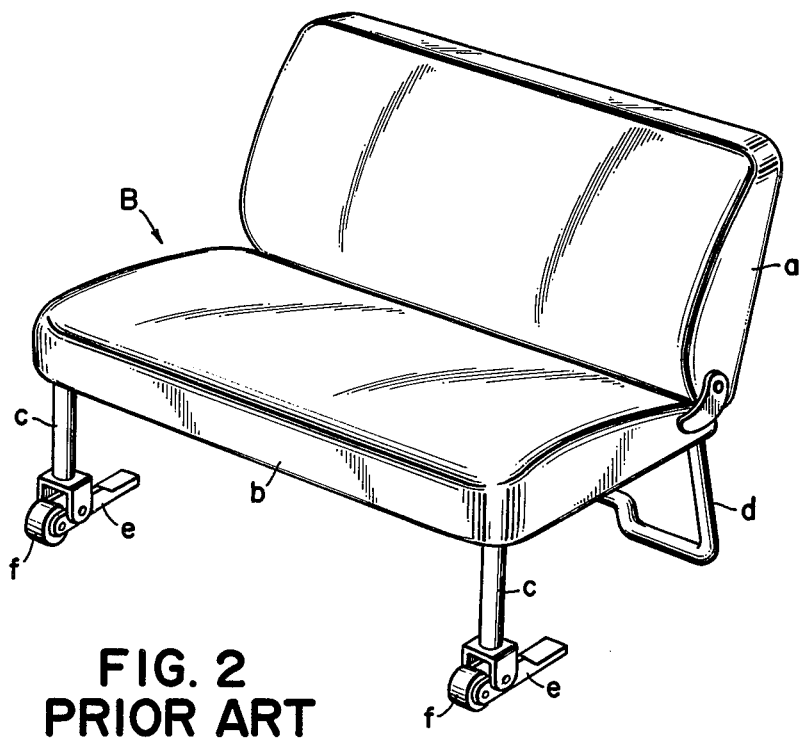
FIG. 2 is a perspective view showing the seat assembly in the second or rearward row.

Referring to the drawings, particularly to FIG. 1, the automobile has a body 1 in which a front seat assembly 2 is mounted. The body 1 further has a floor 3 supporting a forward and rearward rear seat assembly A and B. Each of the rear seat assemblies A and B comprises a back rest a which is pivotably attached to a seat mat b so that the former can be folded or turned over the latter. The seat mat b is supported by front and rear legs c and d. The rear leg d is foldable to place it under the seat mat b but the front leg c is pivotably attached to the floor 3 of the body 1. Thus, the forward seat assembly A can be folded and moved to the position shown by phantom lines A' in FIG. 1. The rearward seat assembly B can be folded at first as shown by phantom lines B' and then moved to the position shown by phantom lines B". For the purpose, the front legs c of the rearward seat assembly B are attached to the floor 3 through detachable fittings e as shown in FIG. 2. Further, wheels 5 are provided at the forward ends of the fittings e.

As previously discussed, this type of seat structure is inconvenient for handling because it is required to disengage the front legs c of the rearward seat assembly B from the floor 3. Further, there is a possibility of causing a danger to the passenger seating in the rearward seat assembly as previously described.

Figure 3:
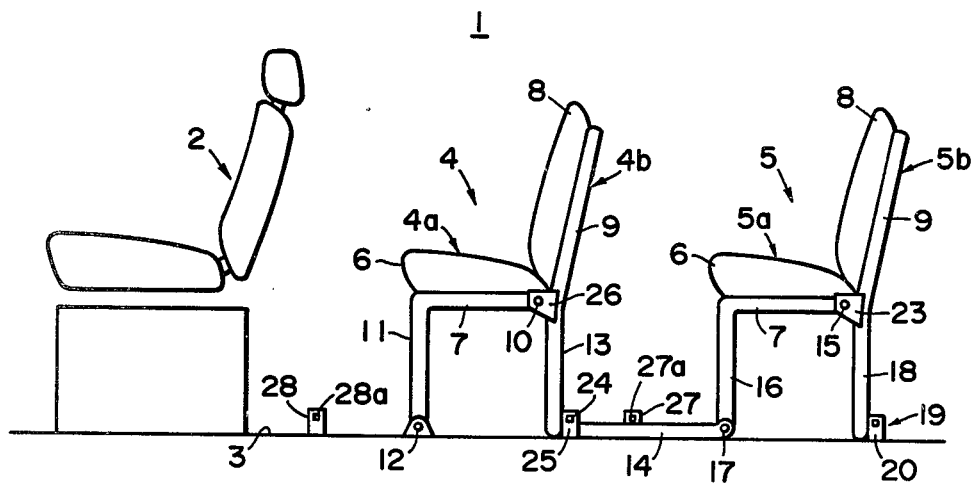
FIG. 3 is a side view showing seat arrangements in accordance with one embodiment of the present invention.

Referring now to FIG. 3 which shows one embodiment of the present invention, there are shown two rear seat assemblies 4 and 5 which are mounted on the floor 3 of the body in tandem fashion behind a front seat assembly 2. The forward rear seat assembly 4 is comprised of a front leg structure having a substantially horizontally extending portion 7 and a substantially vertical portion 11. The vertical portion 11 may include two or more transversely spaced legs although not precisely shown in FIG. 3. On the horizontal portion 7, there is carried a seat mat 6 to provide a seating section 4a of the assembly.

A rear leg structure including a back rest support 9 and rear legs 13 is pivotably connected through brackets 26 and pivot pins 10 with the rear end of the horizontal portion 7 of the front leg structure. A back rest 8 is mounted on the support 9 to constitute a back rest section 4b of the seat assembly.

The vertical portion 11 of the front leg structure is connected through transversely extending pivot pins 12 to the floor 3. The rear legs 13 of the rear leg structure are formed with links 14 which are extending rearwardly from the lower ends of the legs 13. The links 14 are adapted to lie on the floor 3 on which brackets 25 are provided for receiving locking pins 24 so that the links 14 are maintained on the floor 3 by the locking pins 24.

The rearward seat assembly 5 comprises a front leg structure including a horizontal portion 7 and a vertical portion 16. As in the case of the forward seat assembly 4, the vertical portion 16 may include two or more transversely spaced legs. A seat mat 6 is placed on the horizontal portion 7 to constitute a seating section 5a. A rear leg structure including a back rest support 9 and rear legs 18 is pivotably connected with the horizontal portion of the front leg structure through brackets 23 and pivot pins 15. A back rest is attached to the support 9 to constitute a back rest section 5b.

The vertical portion 16 of the front leg structure is pivotably connected at its lower end with the links 14 through transversely extending pins 17. The lower ends of the rear legs 18 are detachably secured to the floor 3 by means of locking mechanisms 19.

Referring now to FIG. 6, the locking mechanism 19 is comprised of a guide plate 19b secured to the leg 18 by a plurality of bolts 19a and a locking pin 19c which is guided by the plate 19b in the transverse direction of the body. On the floor 3, there is mounted a locking plate 20 having an opening 20a for receiving the locking pin 19c. A substantially L-shaped link 19e is mounted on the guide plate 19b through a pin 19d for pivotable movement in a vertical plane. The link 19e has a slot 19f which receives a pin 19g provided on the locking pin 19c. It will thus be noted that a pivotable movement of the link 19e causes a movement of the locking pin 19c into or out of engagement with the opening 20a in the locking plate 20. A spring 19h is provided about the pin 19d so as to act between the leg 18 and the link 19e for biasing the latter in the direction in which the locking pin 19c is forced into engagement with the opening 20a in the locking plate 20.

The link 19e is connected through a vertically extending wire 22 with a handle member 21 which is provided on the back rest support 9. The handle member 21 can be actuated to pull the wire 22 in the upward direction so that the link 19e is moved against the influence of the spring 19h in the direction in which the locking pin 19c is retracted from the opening 20a in the plate 20.

Referring now to FIG. 7, there is shown a connection between the front and rear leg structures. The bracket 23 is of a cross-section of an inverted U-shape and welded to the rear leg structure. A tension spring 23a is provided between the front and rear leg structures so that the horizontal portion 7 of the front leg structure is normally forced upwards under a normal position until it is engaged with the top plate portion 23b of the bracket 23. However, when the horizontal portion 7 of the front leg structure is turned downwardly with respect to the rear leg structure about the pin 15, the spring is moved downwardly beyond the pin 15. Thus, the spring 15 now functions to force the front structure to a position wherein the horizontal portion 7 lies along the rear leg 18 as shown in FIG. 7(b).

The locking pins 24 for the forward seat assembly 4 may be associated with a mechanism which is similar to the locking mechanism 19. Further, the connection between the front and rear leg structures in the forward rear seat assembly may be the same as that shown in FIG. 7. In the position shown in FIG. 3, the seat assemblies 4 and 5 are therefore secured to the floor 3 by the locking pin 24 and the locking mechanism 19, respectively. Further, the front leg structures are maintained in normal positions with respect to the rear leg structures under the influence of the springs 23a.

When it is desired to fold the seat assemblies 4 and 5, the locking mechanism 19 for the rearward seat assembly 5 is at first actuated. For the purpose, the handle member 21 is actuated to pull the wire in the upward direction to thereby rotate the link 19e about the pin 19d against the action of the spring 19h. The locking pin 19c is therefore moved out of engagement with the opening in the locking plate 20.

Figure 4:
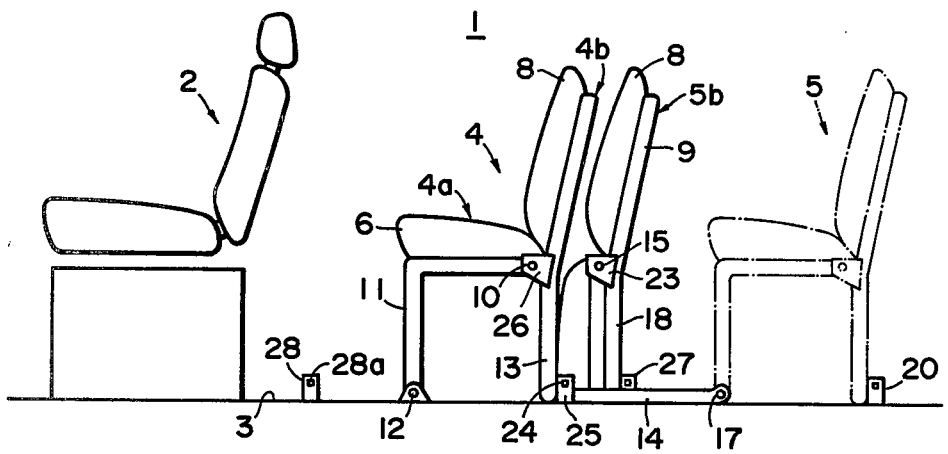
FIG. 4 is a side view similar to FIG. 3 but showing the second row rear seat assembly in folded or retracted position.

Thereafter, the rear leg structure of the seat assembly 5 is slightly lifted and forced forwards. This operation causes the front leg structure to turn about the pin 17 to the position shown in FIG. 4. Thus, a cargo room is provided behind the seat assembly 4. The link 14 of the rear leg structure in the forward seat assembly 4 may be provided at its intermediate portion with a locking plate 27 which has an opening 27a for receiving the locking pin 19c in the position shown in FIG. 4 so that the folded seat assembly 5 is locked to the rear leg structure of the forward seat assembly 4.

Figure 5:
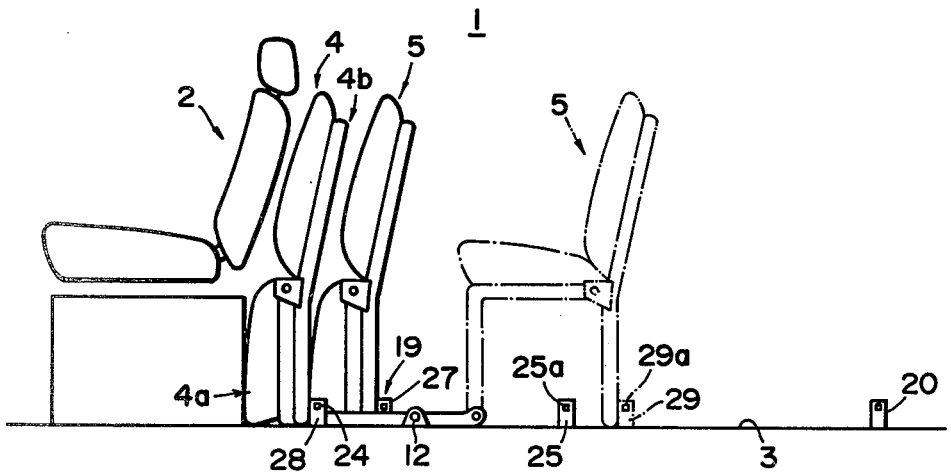
FIG. 5 is a side view similar to FIGS. 3 and 4 but showing the rear seat assemblies in both rows in folded or retracted position.
Figure 6A:
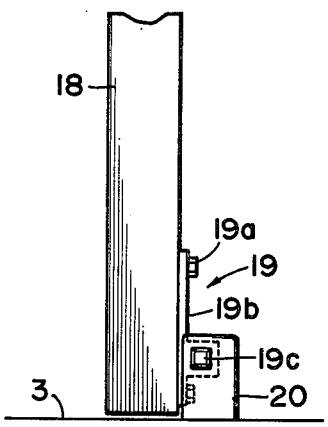
Figure 6B:
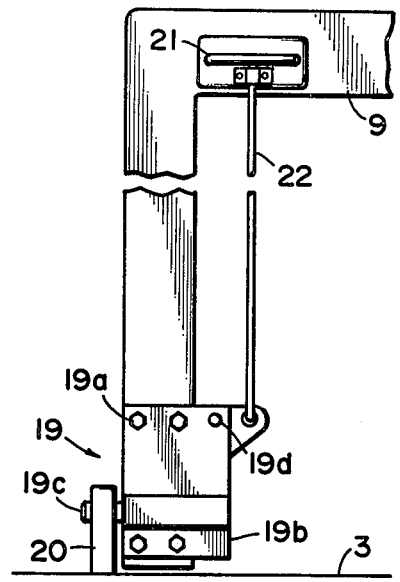
Figure 6C:
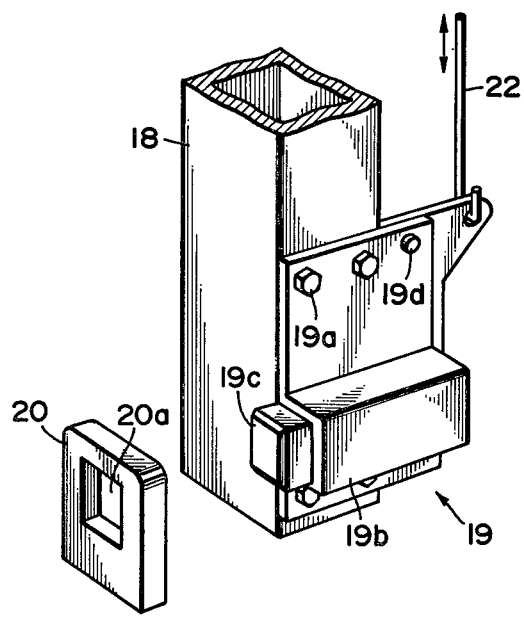
Figure 6D:
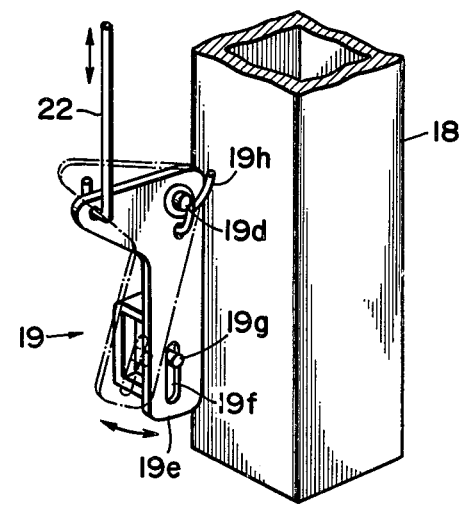

Thereafter, the locking pin 24 is retracted from the locking bracket 25, and the rear leg structure of the forward seat assembly is slightly lifted and forced forwards together with the folded seat assembly 5. The front leg sructure of the seat assembly 4 is then turned forwardly about the pin 12 and the seat assemblies 4 and 5 are folded as shown in FIG. 5. A locking bracket 28 having an opening 28a may be provided at either or each side of the seat assembly 4 so that the locking pin 24 is received in the opening 28a to thereby lock the seat assemblies in the locked position.

If desired, the rearward seat assembly 5 may be erected as shown in phantom lines in FIG. 5 from the folded position shown by solid lines in the same figure. For the purpose, the locking pin 19c in the locking mechanism 19 may be disengaged from the locking plate 27 and the rear leg structure may be moved rearwardly. A locking bracket 29 having an opening 29a may be provided on the floor 3 at each side of the seat assembly 5 so that the locking pin 19c is engaged with the opening 29a in the bracket 29 in the erected position.

In the illustrated embodiment, the locking brackets or plates are described as projecting above the floor 3. It should be noted, however, that the floor may be formed with recesses in which the locking mechanisms are received. Such arrangements may be advantageous in that a perfectly flat floor design can be made possible. Further, although the invention has been shown described with respect to a specific embodiment wherein rear seat assemblies are arranged in two rows in tandem fashion, it should of course be noted that the invention can be applied to an automobile having rear seat assemblies arranged in three or more rows. Thus, it should be understood that the invention is in no way limited to the details of the illustrated embodiment, but changes and modifications may be made without departing from the scope of the appended claims.

I claim:

1. Automobile comprising a body which has a floor, front and rear seat means provided on the floor, said rear seat means including a plurality of seat assemblies arranged in a plurality of rows including a first row and a second row which is behind the first row, the seat assembly in the first row comprising a front leg structure carrying seat mat means and a rear leg structure carrying seat back rest means, said front leg structure being pivotably attached at lower end to the floor of the body, said rear leg structure having rearwardly extending link means, the seat assembly in the second row comprising a front leg structure having lower end pivotably connected with said rearwardly extending link means whereby the seat assembly in the first row can be folded by pivotably moving its front leg structure only after the seat assembly in the second row has been folded by turning the front leg structure of the second row seat assembly over the rearwardly extending link means.

2. Automobile in accordance with claim 1 in which the front leg structure of the first row seat assembly is of a substantially L-shaped configuration having horizontal and vertical portions, and the rear leg structure of the same seat assembly is pivotably connected to the horizontal portion of the front leg structure.

3. Automobile in accordance with claim 2 in which the front leg structure in the second row seat assembly is of a substantially L-shaped configuration having horizontal and vertical portions, and the rear leg structure of the same seat assembly is pivotably connected to the horizontal portion of the front leg structure, the front leg structure of the second row seat assembly being pivotably connected at its vertical portion to the link means of the rear leg structure in the first row seat assembly.

4. Automobile in accordance with claim 3 in which locking means is provided on the rear leg structure of the second row seat assembly for detachable engagment with cooperating bracket means on the floor of the automobile body.

5. Automobile in accordance with claim 4 in which said link means on the rear leg structure of the first row seat assembly is provided with bracket means for engagement with the locking means in the rear leg structure of the second row seat assembly when the second row seat assembly has been folded over the link means.

6. Automobile in accordance with claim 2 in which spring means is provided between the rear leg structure and the horizontal portion of the front leg structure of the first row seat assembly so that it acts at one side of pivotable connection between the front and rear leg structures when the seat assembly is in erected position but at the other side of the connection when the seat assembly is in folded position.

7. Automobile in accordance with claim 3 in which spring means is provided between the rear leg structure and the horizontal portion of the front leg structure of the second row seat assembly so that it acts at one side of pivotable connection between the front and rear leg structures when the second row seat assembly is in erected position but at the other side of the connection when the second row seat assembly is in folded position.

* * * * *